(12) United States Patent
Huber (10) Patent No.: US 10,670,131 B2
(45) Date of Patent: Jun. 2, 2020

(54) COMPLEX CAST COMPONENT AND CASTING METHOD THEREFOR

(71) Applicant: Bayerische Motoren Werke Aktiengesellschaft, Munich (DE)

(72) Inventor: Markus Huber, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 435 days.

(21) Appl. No.: 15/083,439

(22) Filed: Mar. 29, 2016

(65) Prior Publication Data
US 2016/0208901 A1 Jul. 21, 2016

Related U.S. Application Data

(63) Continuation of application No. PCT/EP2014/073060, filed on Oct. 28, 2014.

(30) Foreign Application Priority Data

Nov. 14, 2013 (DE) ........................ 10 2013 223 179

(51) Int. Cl.
*B22D 25/02* (2006.01)
*B22D 25/06* (2006.01)
(Continued)

(52) U.S. Cl.
CPC ............. *F16H 53/025* (2013.01); *B22C 1/00* (2013.01); *B22C 9/10* (2013.01); *B22C 9/103* (2013.01);
(Continued)

(58) Field of Classification Search
CPC ........ B22D 15/02; B22D 25/02; B22D 25/06; B22D 27/04; B22C 9/10; B22C 9/22; B22C 9/24
See application file for complete search history.

(56) References Cited

U.S. PATENT DOCUMENTS 2,103,185 A * 12/1937 Rumpler ................... F16C 3/08
74/596
2,109,083 A 2/1938 Campbell
(Continued)

FOREIGN PATENT DOCUMENTS

CN 1968769 A 5/2007
DE 678 539 A 7/1939
(Continued)

OTHER PUBLICATIONS

Chinese-language Office Action issued in counterpart Chinese Application No. 201480057136.4 dated Nov. 1, 2016 with English translation (Nineteen (19) pages).
(Continued)

*Primary Examiner* — Kevin E Yoon
*Assistant Examiner* — Jacky Yuen
(74) *Attorney, Agent, or Firm* — Crowell & Moring LLP (57) ABSTRACT

A complex cast component of an internal combustion engine, in particular a crankshaft or a camshaft, has a longitudinal axis, a plurality of regions, along the longitudinal axis, and a first cavity. Each of the plurality of regions has a certain cool-down rate during a solidification process of a casting process. The first cavity is arranged in a first region of the plurality of regions and has a volume that depends on a first cool-down rate of the first region. In this way, a material thickness in the first region likewise depends on the first cool-down rate.

6 Claims, 6 Drawing Sheets

(51) Int. Cl.

| | | |
|---|---|---|
| *B22D 15/00* | (2006.01) | |
| *B22C 9/10* | (2006.01) | |
| *F16H 53/02* | (2006.01) | |
| *B22D 27/04* | (2006.01) | |
| *F16C 3/08* | (2006.01) | |
| *B22C 1/00* | (2006.01) | |
| *B22C 9/22* | (2006.01) | |
| *B22D 29/00* | (2006.01) | |
| *F16C 3/06* | (2006.01) | |

(52) U.S. Cl.
CPC ............... *B22C 9/22* (2013.01); *B22D 15/00* (2013.01); *B22D 25/02* (2013.01); *B22D 25/06* (2013.01); *B22D 27/04* (2013.01); *B22D 29/001* (2013.01); *F16C 3/06* (2013.01); *F16C 3/08* (2013.01)

(56) References Cited

U.S. PATENT DOCUMENTS

| | | | |
|---|---|---|---|
| 3,965,962 A | 6/1976 | Tanaka et al. | |
| 4,191,238 A | 3/1980 | Pichl | |
| 5,140,896 A | 8/1992 | Duran | |
| 5,297,611 A * | 3/1994 | Legge | B22C 9/08 164/353 |
| 6,478,074 B1 | 11/2002 | Basler et al. | |
| 2007/0193405 A1 | 8/2007 | Shibano et al. | |
| 2007/0251664 A1 * | 11/2007 | Hanna | B22C 7/02 164/458 |
| 2007/0277645 A1 | 12/2007 | Weisskopf et al. | |
| 2011/0220044 A1 | 9/2011 | Elnick et al. | |
| 2012/0000877 A1 * | 1/2012 | Smith | B22C 9/02 213/155 |
| 2013/0152731 A1 | 6/2013 | Murrish et al. | |

FOREIGN PATENT DOCUMENTS

| | | |
|---|---|---|
| DE | 23 24 240 C3 | 5/1977 |
| DE | 43 23 168 C1 | 9/1994 |
| DE | 196 51 392 A1 | 9/1997 |
| DE | 198 33 594 A1 | 1/2000 |
| DE | 101 40 332 C1 | 4/2003 |
| DE | 10 2011 012 941 A1 | 12/2011 |
| DE | 10 2012 222 645 A1 | 6/2013 |
| EP | 0 605 491 B1 | 10/1997 |
| EP | 1 767 288 A1 | 3/2007 |
| EP | 1 852 198 A3 | 10/2008 |
| GB | 481928 A | 3/1938 |
| GB | 694277 A | 7/1953 |
| GB | 781788 A | 8/1957 |
| JP | 63093446 A * | 4/1988 |
| JP | 2004-25260 A | 1/2004 |

OTHER PUBLICATIONS

International Search Report (PCT/ISA/210) issued in PCT Application No. PCT/EP2014/073060 dated Jan. 29, 2015 with English-language translation (six (6) pages).

German-language Written Opinion (PCT/ISA/237) issued in PCT Application No. PCT/EP2014/073060 dated Jan. 29, 2015 (five (5) pages).

German Search Report issued in counterpart German Application No. 10 2013 223 179.2 dated Jul. 22, 2014 with partial English-language translation (fifteen (15) pages).

* cited by examiner

COMPLEX CAST COMPONENT AND CASTING METHOD THEREFOR

CROSS REFERENCE TO RELATED APPLICATIONS

This application is a continuation of PCT International Application No. PCT/EP2014/073060, filed Oct. 28, 2014, which claims priority under 35 U.S.C. § 119 from German Patent Application No. 10 2013 223 179.2, filed Nov. 14, 2013, the entire disclosures of which are herein expressly incorporated by reference.

BACKGROUND AND SUMMARY OF THE INVENTION

The present invention relates to a complex cast component of an internal combustion engine, to an internal combustion engine having a complex cast component, to a motor vehicle having a corresponding internal combustion engine, and to a casting method for producing a complex cast component. Below, the expression "complex cast component of an internal combustion engine" is to be understood to mean, for example, a cast crankshaft, camshaft or some other cast component of an internal combustion engine which, in relation to a simple shaft or a simple smooth surface, has an outer structure which has projections and/or recesses.

According to prior art, crankshafts in modern Otto-cycle and diesel engines are manufactured from iron materials by forging or casting. In the case of forged crankshafts, tempering steels such as 42CrMo4, for example, are used as material. By contrast, in the case of cast crankshafts, predominantly cast iron with spheroidal graphite, such as GJS700, is used as material. By means of the casting process, it is normally the case that a crankshaft is produced as a solid casting, that is to say without cavities or hollow chambers in the interior of the crankshaft. It is however known, specifically in the case of internal combustion engines that are subject to low load, to use cast crankshafts, the main bearings or pin bearings of which are cast so as to be hollow for weight reasons.

Owing to constantly increasing component loads, in particular owing to turbocharging, and secondly owing to the demand to reduce the bearing diameters in order to reduce friction, it is ever more common for forging steels with correspondingly high strength to be used in the production of crankshafts. In relation to casting materials, this leads to a considerable increase in weight, and generally also to an increase in costs. The loads on a crankshaft in an internal combustion engine are highly complex. During the operation of an internal combustion engine, various load states arise at the crankshaft in a manner dependent on a rotational speed, a load and a position on the crankshaft. It is the maximum loads in each case that are relevant in terms of design. In the case of a crankshaft, in general, that axial end which is coupled to the gearbox is subject to higher loads, owing to combined bending and torsional load, than the opposite axial end.

Disadvantages when using forged crankshafts include the high costs and the high weight owing to the greater density in relation to the cast crankshaft. Furthermore, free shaping is possible only with restrictions. A weight reduction for structural reasons in the interior of mass accumulations which are large in relation to the crankshaft as a whole can be achieved only in cumbersome fashion by way of additional bores.

A disadvantage in the use of cast crankshafts is the lower load capacity thereof in relation to forged crankshafts. The reasons for this lie in the different manufacturing technologies, which require different alloys and/or heat treatments. Likewise, a cast microstructure is, by its nature, less dynamically loadable than a forged microstructure.

In the production of crankshafts by casting, use is presently made primarily of two technologies. In a first form, the crankshafts are cast, normally horizontally, by sand casting. In this case, so-called negative mold patterns are produced from mold sand, which negative mold patterns serve for shaping purposes for the liquid metal.

Alternatively, the crankshafts are cast vertically using a so-called shell mold casting method. In the case of shell mold casting, so-called shells with the shape of the blank are produced. Depending on the external shape of the component to be cast, a finished shell is composed of two or more shell parts which are connected to one another, for example by way of adhesive, to form the finished shell. The individual shell parts are composed of resin-encased mold material or resin-encased sands or sand-resin mixtures. Furthermore, a sprue system for the feed of the liquid metal is integrated into the shell.

In preparation for the production of the crankshaft, the finished shells are placed into so-called casting tubs and, in order to improve the heat dissipation and for stabilization, have steel balls filled in around them. The shell mold as a whole is then filled with the casting material from the bottom upwards. During the solidification of material, a feeder performs the task of compensating for material shrinkage. The shell mold casting technique has become established for use in mass production. Furthermore, the shell mold casting method has the advantage over sand casting methods that, in particular, the solidification process leads to improved microstructure quality and dimensional accuracy owing to the accelerated dissipation of heat through the use of the steel balls.

Nevertheless, even with the use of the shell mold casting method, different temperatures or different temperature distributions arise in the casting tub and thus in the component during the solidification process. This leads to different material characteristics of the solidified component in a manner dependent on the cooling rate during the solidification process. In particular, higher temperatures prevail, for thermal reasons, in the upper region of the casting tub than in the lower region. This is owing to the fact that, initially, the heat is dissipated rapidly from the lower region of the casting shell by way of the steel balls, but a heat build-up occurs in the upper region of the steel balls. As a result, the cooling rates during the solidification of the melt are lower in the upper region of the cast crankshaft than in the lower region. Different solidification conditions, and consequently different material characteristics of the crankshaft and of the component, are generated owing to the changed cooling rates.

It is the object of the present invention to overcome the abovementioned disadvantages of the prior art and to provide a complex cast component of an internal combustion engine, in particular a crankshaft or a camshaft, which is optimized with regard to material characteristics, and to provide a corresponding production method.

The above object is achieved by way of a complex cast component of an internal combustion engine, an internal combustion engine having a complex cast component, a motor vehicle having an internal combustion engine, and a casting method for producing a complex cast component of an internal combustion engine, all in accordance with embodiments of the invention.

The complex cast component according to the invention of an internal combustion engine, in particular a crankshaft or a camshaft, comprises a longitudinal axis, a multiplicity of regions along the longitudinal axis, wherein each region of the multiplicity of regions has a specific cooling rate during a solidification process during the course of a casting process, and a first cavity which is arranged in a first region of the multiplicity of regions and which has a volume dependent on a first cooling rate of the first region, whereby a material thickness in the first region is likewise dependent on the first cooling rate.

The present invention will now be illustrated by way of example on the basis of the production method for producing a crankshaft as a complex cast component. Firstly, a casting mold for the crankshaft is provided. Furthermore, a first core having a first volume is provided. The first volume forms, in the finished cast component, the first cavity below and is selected on the basis of a first cooling rate in the first region of the crankshaft to be cast. Accordingly, the first core is arranged in the casting mold so as to be arranged in the first region during a subsequent solidification process of a casting material. Thereafter, the casting material, for example a casting iron, is introduced into the casting mold, and after the solidification process is complete, the finished crankshaft is removed from the casting mold.

In general, it is assumed that the cooling rates for the complex cast component as a whole as a solid casting, that is to say for all of the regions along the longitudinal axis of the cast component, are known. The complex cast component of a solid casting is also referred to as conventional or known cast component. Thus, for the conventional cast component, the cooling rate in the first region is also known. The regions of the multiplicity of regions may be portions of the component, wherein preferably, a region encompasses only a part of a portion of the cast component. Furthermore, regions may also at least partially overlap or be spaced apart from one another in a manner dependent on the external shape of the complex cast component. Below, the regions will be discussed in more detail, and the function thereof presented, with reference to the drawings.

The respective cooling rates for the cast component according to the invention to be cast can, for example, be derived from a simulation or determined by tests, to name but a few possibilities. The first cooling rate is thus in particular a predefinable or desired cooling rate in the first region, which can be varied by adaptation of the volume of the first cavity or of the first core. Thus, the volume of the first core, and thus of the resulting first cavity, also varies in a manner dependent on the desired cooling rate in the first region.

In this way, the first cooling rate in the first region can be set as desired. A desired setting may be realized for example by virtue of the entire cast component according to the invention cooling as uniformly as possible, that is to say with preferably the same cooling rate. This has an advantageous influence on the strength of the resulting complex cast component.

The ratio of the volume of the first core or of the first cavity in relation to the volume of the first region will hereinafter also be referred to as first relative volume. The first core for forming the first cavity in the first region is in this case not restricted to any particular shape. Rather, the shape arises in a manner dependent on the desired first cooling rate in the first region.

In summary, an advantage of the complex cast component according to the invention is therefore that a cooling rate in the first region can, owing to the core that is used, be increased in relation to the conventional cast component as a solid casting, that is to say without a cavity, in said region. Through the adaptation of the cooling rate in the first region for example to the cooling rates of the other regions, it is possible to set similar or identical material characteristics along the longitudinal axis of the complex cast component, if this is desired. Intentional setting of different material characteristics through the adjustment of the first cooling rate in the first region owing to the core that is used is also possible. A further result of this approach is that the complex cast component has a reduced material thickness in the first region.

In a preferred embodiment, the complex cast component has a second cavity in a second region of the multiplicity of regions. A second volume of the second cavity is selected in a manner dependent on a second cooling rate in the second region. The first cavity has, for example, a smaller volume in relation to the first region than the second cavity has in relation to the second region. A first cooling rate in the first region is in this case higher than a second cooling rate in the second region, wherein a conventional cast component as a solid casting is taken as a reference, as discussed in the introduction. The desired first and second cooling rates may then be equal. Preferably, in this way, a first material thickness in the first region of the complex cast component is greater than a second material thickness in the second region of the complex cast component.

To achieve this, in the casting method, a second core having a second volume is provided, said second volume having been selected on the basis of a second cooling rate in the second region of the crankshaft to be cast. Furthermore, the second core has, for example, a greater volume in relation to the second region than the first core has in relation to the first region. This is because, for example, the second region has, in relation to the conventional cast component as a solid casting, a lower cooling rate than the first region. In order that, for example, the first and the second region now have the same cooling rates as desired cooling rates during the solidification of the cast component according to the invention, the volume of the second core in relation to the second region must be greater than the volume of the first core in relation to the first region. The first and/or the second region preferably have/has a large volume in relation to the volume of the cast component according to the invention as a whole. In relation to a conventional cast component, these are thus regions with material accumulation, as will likewise be discussed in more detail further below. It is particularly preferable for the first and the second region to have a similar or equal volume, whereby a different material thickness of the two regions is also realized.

The arrangement of the first and of the second core in the casting mold is thus performed such that, during a subsequent solidification process of a casting material, the first core is arranged in the region with the first cooling rate and the second core is arranged in the region with the second cooling rate. In one embodiment, the two cores are connected to one another by way of a web, which in the subsequent cast component leads to a connection of the two cavities by way of a duct. In this way, it is possible for a relative spacing of the cores that are used with respect to one another to be ensured, and for casting material to be saved.

If the casting material is now introduced into the casting mold, then in a subsequent solidification process, the second cavity with the, for example, relatively large relative volume forms in the second region with the lower cooling rate in relation to the first region. This means that, also, the material thickness of the complex cast component is smaller in the second region than in the first region. In this way, the material characteristics in the first and second regions can be optimized such that the complex cast component later has as far as possible equal material characteristics in the two regions. In a preferred embodiment, a first material thickness in the first region of the complex cast component is therefore greater than a second material thickness in the second region of the complex cast component. The above statements regarding the first cavity furthermore apply analogously to the second cavity.

An advantage of the correspondingly produced complex cast component is also that the wall thicknesses in the first and in the second region of the cast component are optimized in a manner dependent on the respective cooling rate during the solidification process. At the locations or regions which, according to prior art, have a low cooling speed or cooling rate, higher cooling speeds and thus improved material characteristics are now realized. In this way, a volume dependency of the solidification process is also optimized. The result is a complex cast component of an internal combustion engine which has the desired material characteristics at every point of the two regions, advantageously in the cast component as a whole. Furthermore, in this way, a weight advantage in relation to forged complex components of an internal combustion engine, in particular of a crankshaft or camshaft, can be realized, whereby a fuel consumption advantage during the use of the cast component according to the invention in an internal combustion engine is likewise realized. The size of the cavities, which is dependent on the cooling rate during the solidification process, in the interior of the cast component according to the invention furthermore yields a lower material requirement in relation to a conventional cast component without cavities or with uniform cavities. It is thus possible to realize a weight and cost advantage of cast components, in particular crankshafts or camshafts, even in the case of highly loaded internal combustion engines.

In a preferred embodiment, the complex cast component has a multiplicity of cavities, wherein each cavity of the multiplicity of cavities is arranged in a region of the cast component, and a respective volume of the cavities is dependent on the specific cooling rate in relation to the respective region, and preferably increases along the longitudinal axis of the complex cast component, such that preferably, the corresponding material thickness in the respective region of the respective cavity correspondingly decreases along the longitudinal axis of the complex cast component. In a first embodiment, the multiplicity of regions is identical to the multiplicity of cavities, such that a cavity is present in each region. In an alternative embodiment, a greater number of regions than cavities is provided, wherein, in this case, in particular, a region which already has a desired cooling rate does not have an additional cavity.

Referring again to the production method or casting method, for this purpose, a multiplicity of cores having volumes dependent on the cooling rates of the respective regions is used; for example, the volumes of the cores differ. The cores are then arranged within the casting mold such that the core with the smallest relative volume is arranged in the region with the highest cooling rate, and the core with the largest relative volume is arranged in the region with the lowest cooling rate, wherein the cooling rate relates in this case to the conventional cast component, as will be discussed in detail below with reference to the drawing and has likewise already been discussed in the introduction. The other cores are arranged in between in a manner dependent on their relative volume in accordance with the above principle. In an embodiment such as has already been described above for the first and the second core, the cores are connected to one another by way of webs. In this case, it is possible, in a manner dependent on the number of cores used and the positioning thereof in the cast component, for different numbers of cores to be connected to one another by way of such webs. For example, it is possible for always two, three or four cores to be connected to one another by way of webs, such that, in the subsequent cast component, two, three or four cavities are connected to one another by way of a duct. The above statements regarding the first and the second core or cavity apply analogously to a multiplicity of cores or cavities. An advantage of this complex cast component is that, in this way, it is possible for the material characteristics to be set even more precisely, and the solidification process thus advantageously influenced.

In a further preferred embodiment, the complex cast component is a crankshaft, and each region is formed either by a main bearing or by a pin bearing. By way of example, reference will now be made to a crankshaft having four pin bearings and five main bearings. The sequence of the bearings along the longitudinal axis is in this case main bearing one, pin bearing one, main bearing two, pin bearing two, main bearing three, pin bearing three, main bearing four, pin bearing four and main bearing five. Here, main bearings are those sections of the crankshaft arranged centrally on the longitudinal axis, whereas the pin bearings are arranged radially offset with respect to the longitudinal axis running centrally through the crankshaft, as will be illustrated further below with reference to the drawings. The first region preferably comprises a main bearing at one of the axial ends of the crankshaft, and/or the second region comprises the main bearing at the opposite axial end. In particular with the use of a shell mold casting process in a vertical arrangement, wherein the casting material is introduced from the gearbox side of the crankshaft to be cast, the first cavity is situated at a gearbox end of the crankshaft. The gearbox end is in this case that end which can be or is coupled to a gearbox during the subsequent use of the crankshaft in an internal combustion engine.

It is furthermore preferable for the complex cast component to be a crankshaft which has a cavity in each pin bearing, wherein a volume of the cavities in relation to the respective region, that is to say the respective pin bearing, increases along the longitudinal axis of the crankshaft. As already discussed above, the complex cast component may generally comprise a multiplicity of cavities, wherein a respective volume of the cavities increases along the longitudinal axis of the complex cast component, such that the material thickness in the region of the respective cavities correspondingly decreases along the longitudinal axis.

In a preferred embodiment, the complex cast component is a crankshaft for an internal combustion engine having four cylinders, and has eight cavities. In this case, four cavities are arranged in the regions of the pin bearings, and at least one cavity is arranged in the region of one of the two main bearings at the axial ends. The remaining three cavities are arranged in the regions of the remaining three main bearings, wherein no cavity is provided in the region of the remaining main bearing at the remaining axial end.

An internal combustion engine according to the invention comprises a complex cast component according to the invention. For the internal combustion engine, the above-described advantages are attained, such that these will not be repeated again at this juncture.

A motor vehicle according to the invention has an internal combustion engine according to the invention. With regard to the motor vehicle according to the invention and the corresponding advantages, reference is likewise made to the above statements regarding the complex cast component according to the invention.

A casting method according to the invention for producing a complex cast component according to the invention of an internal combustion engine, in particular a crankshaft or a camshaft, comprises the steps: providing a casting mold, providing a first core having a first volume selected on the basis of a first cooling rate in a first region of a multiplicity of regions of the cast component during a solidification process, arranging the first core in the casting mold such that the core is arranged in the first region during a subsequent solidification process of a casting material, introducing the casting material into the casting mold, and removing the finished cast component from the casting mold after the solidification process is complete. With the casting method according to the invention, it is for example possible to produce the above-described complex cast component according to the invention. With regard to the resulting advantages, reference is likewise made to the above statements regarding the cast component according to the invention. In a particularly preferred embodiment, in addition to the cooling rate, consideration is also given to an expected load on the finished cast component in the predefinable region, such that the cast component can be designed in a particularly optimized manner with regard to the subsequent field of use. Furthermore, it is preferably the case that the individual regions of the multiplicity of regions together take up a large volume in relation to the component as a whole. The individual regions are thus in particular regions with material accumulations in relation to a conventional cast component as a solid casting.

In a preferred embodiment, the casting method according to the invention comprises the further step of providing a second core having a second volume selected on the basis of a second cooling rate in a second region of the multiplicity of regions of the cast component during a solidification process, wherein in particular, the first volume of the first core in relation to the first region is smaller than the second volume of the second core in relation to the second region. With regard to the correspondingly resulting advantages, reference is likewise made to the above statements regarding the complex cast component according to the invention.

In a further preferred embodiment, a multiplicity of cores is provided, which are arranged in the casting mold such that a volume of the respective core is dependent on the specific cooling rate in relation to the respective region in which it is arranged, wherein preferably, the volume increases along a longitudinal axis of the cast component to be cast, wherein the respective regions preferably take up a large volume, and in particular equal volumes, in relation to the component as a whole. In this way, the core with the greatest relative volume is always arranged in the region with the lowest cooling rate, and the core with the smallest relative volume is always arranged in the region with the highest cooling rate, wherein the cooling rate relates in this case to the conventional cast component. The other cores are arranged in between in a manner dependent on their relative volume such that the relative volume increases with decreasing cooling rate in relation to the cast component according to the prior art. This has the further advantage that the material thickness in the respective region of the cast component according to the invention can be set as desired. Furthermore, in the cast component according to the invention, it is possible to set a desired or predefinable cooling rate in the respective region. It is thus possible, in particular, for material characteristics of the complex cast component to be optimally adapted to a respective intended use of the cast component in a manner dependent on the cooling rates during the casting process.

It is furthermore preferable if, as material for the cores, a material is selected which has a high heat abstraction rate, for example a chromium ore sand. Chromium ore sand in particular has better heat abstraction characteristics than conventional quartz sand, which furthermore has a positive influence on the solidification of the cast component with regard to the resulting material characteristics. Aside from the material for the cores, the material of the supporting structure for the arrangement of the cores within the casting mold also has a high heat abstraction rate. Accordingly, the supporting structure may also be formed from chromium ore sand. Alternatively or in addition to this, the supporting structure may at least partially also comprise a metal, thus additionally positively influencing the solidification.

The casting method is preferably a shell mold casting method. Here, in particular, the casting mold is provided in two parts, wherein the cores are arranged in the casting mold before the two parts of the casting mold are connected to one another, for example by adhesive bonding. The cores are arranged in the interior of the casting mold preferably by way of supporting points or supporting structures, such that, specifically in the case of a multiplicity of cores, these are also connected to one another by way of corresponding webs. The number of cores connected to one another by way of webs is in this case variable. The casting mold equipped with the cores and adhesively bonded together is, for the introduction of the casting material, arranged vertically in a casting tub and filled from below. The casting mold is correspondingly fixed in the casting tub by way of steel balls, which in this case also perform a heat dissipation function. It is particularly preferable, in the case of a crankshaft to be cast, for the introduction of the casting material to be performed proceeding from the gearbox side.

When the casting material has been introduced into the casting mold, it is then the case during a subsequent solidification process that the cooling rate is at its highest in the lower region of the casting mold. In the upward longitudinal direction, the cooling rate decreases for example continuously. Since the cores are, with regard to a crankshaft, arranged preferably in the region of the main bearings or pin bearings, it is now the case that a reduced material thickness in relation to a conventional crankshaft is realized in said regions owing to the different relative volumes of the cores. In this way, the adverse effect resulting from a reduced cooling rate in particular in the upper region of the complex cast component can be compensated for. The cores are removed from the finished cast component in the conventional manner, such that this will not be discussed in any more detail here.

Other objects, advantages and novel features of the present invention will become apparent from the following detailed description of one or more preferred embodiments when considered in conjunction with the accompanying drawings.

DETAILED DESCRIPTION OF THE DRAWINGS

The present invention will be described in detail on the basis of a crankshaft as a complex cast component, wherein other complex cast components of an internal combustion engine, such as a camshaft, can be produced using the same production method. In addition to a cast crankshaft or camshaft, a complex cast component of an internal combustion engine may also be understood to mean some other cast constituent part of the internal combustion engine which, in relation to a simple shaft or a simple smooth surface, has an outer structure which has projections and recesses.

Figure 1:
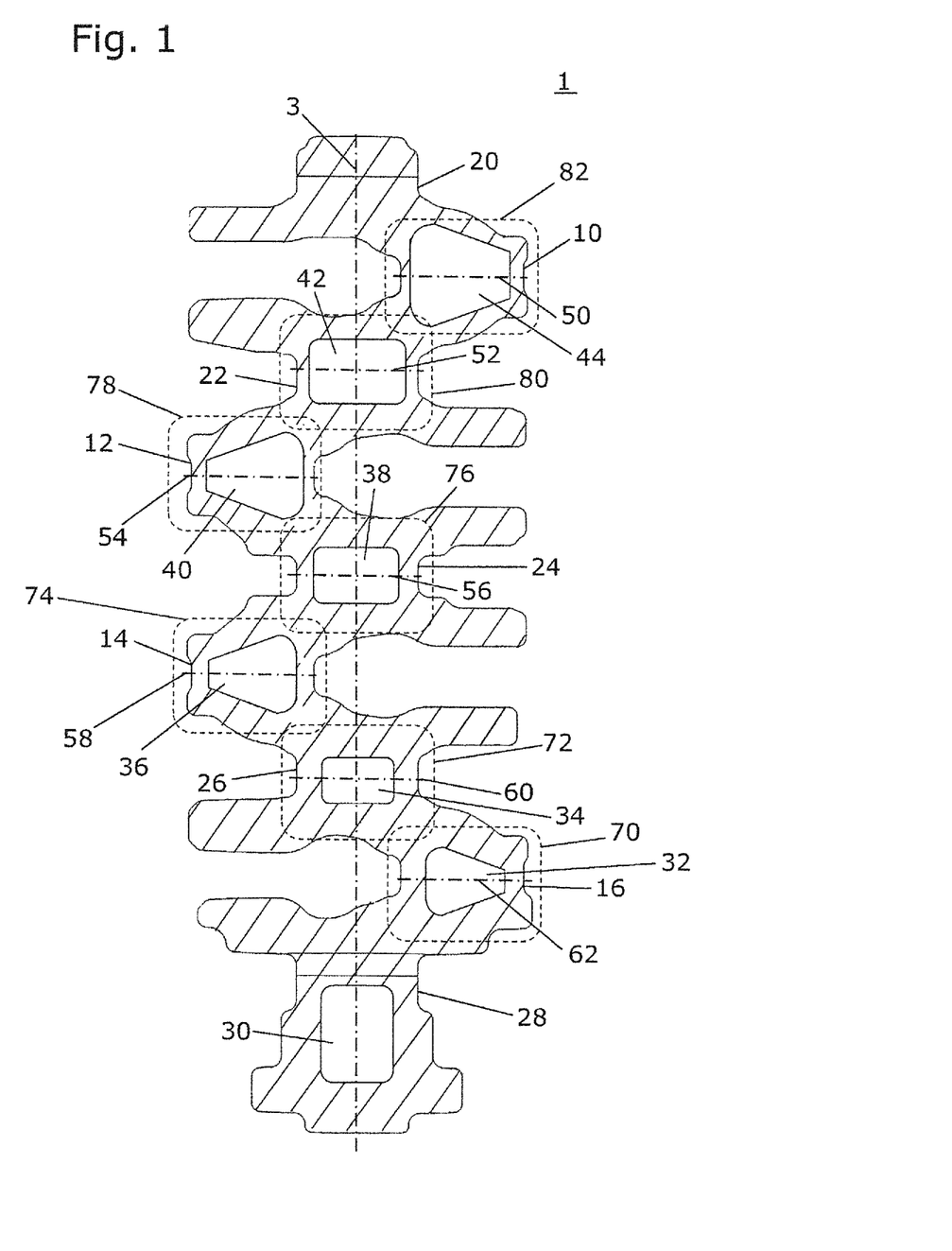
FIG. 1 is a sectional view through a crankshaft according to an embodiment of the invention.

FIG. 1 shows a sectional view through an exemplary complex cast component according to the invention in the form of a crankshaft 1. The crankshaft 1 has a longitudinal axis 3 and has four pin bearings 10, 12, 14 and 16 and five main bearings 20, 22, 24, 26 and 28. Also shown, for each of the four pin bearings 10, 12, 14 and 16 and for four of the five main bearings 20, 22, 24, 26 and 28, is a respective axis 50, 52, 54, 56, 58, 60, 62 which runs transversely with respect to the longitudinal axis 3 of the crankshaft 1. For example, the first pin bearing 10 has the axis 50, and the fourth pin bearing 16 has the axis 62. The fifth main bearing 28 constitutes the gearbox side or the gearbox end, and a first axial end of the crankshaft 1. Accordingly, the first main bearing 20 constitutes the second axial end.

The crankshaft 1 furthermore comprises eight regions, of which only seven regions 70, 72, 74, 76, 78, 80 and 82 are marked. In the present case, the eight regions 70, 72, 74, 76, 78, 80 and 82 comprise in each case one bearing, wherein the first main bearing 20 is not assigned to a region. For example, the first region 70 comprises the fourth pin bearing 16 and the eighth region 82 comprises the first pin bearing 10.

In the interior of the crankshaft 1, eight cavities 30, 32, 34, 36, 38, 40, 42 and 44 are provided in the region of the respective main bearings 20, 22, 24, 26 and 28 and pin bearings 10, 12, 14 and 16. For better comprehensibility, ducts that may be present in reality owing to a supporting structure, which ducts connect two or more cavities 30, 32, 34, 36, 38, 40, 42 and 44 to one another or constitute an opening to the surface of the crankshaft 1, have not been illustrated. For a volume of the cavities, it is the case that the volume is selected in a manner dependent on the cooling rate in the respective region of the crankshaft 1. In this regard, for better comprehensibility, the production method according to the invention will firstly be discussed.

Figure 5:
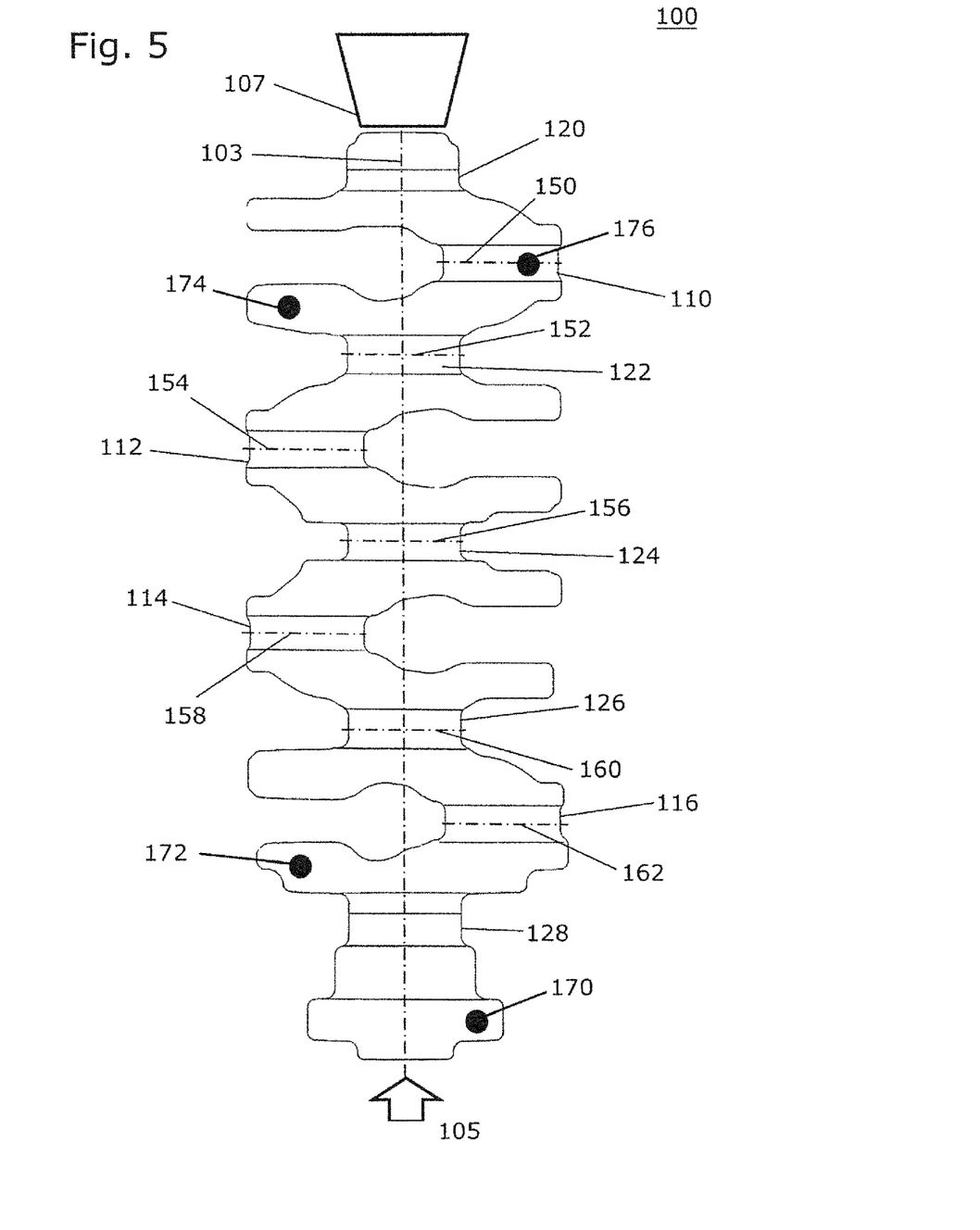
FIG. 5 illustrates a half of a shell casting mold.
Figure 6:
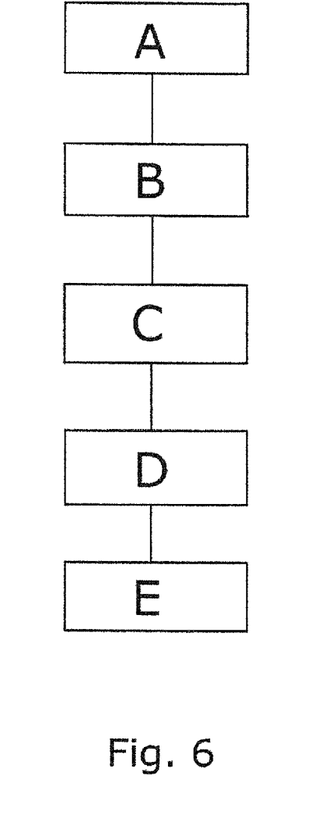
FIG. 6 is a schematic flow chart of the method sequence of a casting method according to an embodiment of the invention.

The crankshaft, as a complex cast component, is produced by way of a preferably vertical shell mold casting method, the method sequence of which is schematically illustrated in FIG. 6. Firstly, in step A, a casting mold is provided. An example of a shell half 100 for a crankshaft 1 is shown in FIG. 5.

In the exemplary vertical shell mold casting method, the introduction of the casting material during the subsequent casting process is performed from below. Referring to FIG. 5, there is a longitudinal axis 103, the filling direction is indicated by the arrow 105, wherein, by contrast to conventional shell mold casting methods, the gearbox side of the finished crankshaft 1 with the fifth main bearing 28 is arranged at the bottom after the casting process.

The shell mold as a whole is, as will be explained below, filled with the casting material, preferably with cast iron, from below, with the casting material rising upward. During the subsequent material solidification, a feeder 107 performs the task of compensating for material shrinkage. Analogously to the crankshaft 1, the four pin bearing regions 110, 112, 114 and 116 and the five main bearing regions 120, 122, 124, 126 and 128 have also been indicated. The axes 150, 152, 154, 156, 158, 160, 162 of the respective resulting bearings are likewise shown.

In the conventional casting process, the two halves of the shell casting mold would now be placed together, and would be filled with casting material without the cores for forming cavities being provided therein. With regard to cooling rates, the distribution discussed in the introduction would arise, with the highest cooling rate prevailing at the lower end, that is to say at the gearbox end in the situation illustrated, and the lowest cooling rate prevailing at the opposite axial end. At four exemplary measurement points 170, 172, 174 and 176, the resulting tensile strength would then be such that the tensile strength at the second measurement point 172 would be lower than that at the first measurement point 170, and the tensile strength at the third measurement point 174 would be lower than that at the second measurement point 172.

Therefore, in step B, at least one core is provided. It is, however, preferable for two cores, and particularly preferably a multiplicity of cores, for example eight cores, to be provided. The design of the cores, that is to say the shape and volume thereof, is dependent on the region in which they are to be arranged in the casting mold or in the cast component. In this regard, for better comprehensibility, FIGS. 2 to 4 will be discussed.

Figure 2:
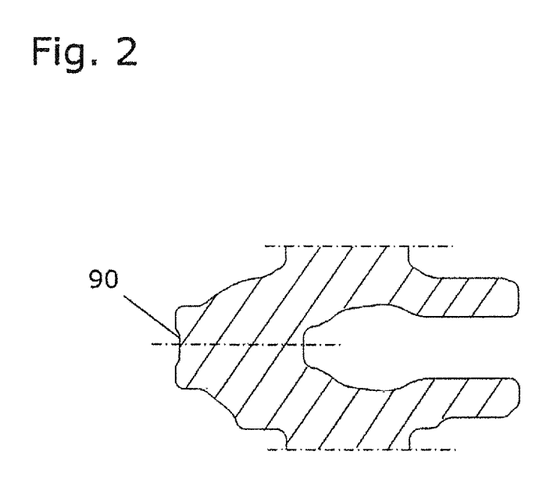
FIG. 2 is a sectional view through a portion of a crankshaft without cavity.
Figure 3:
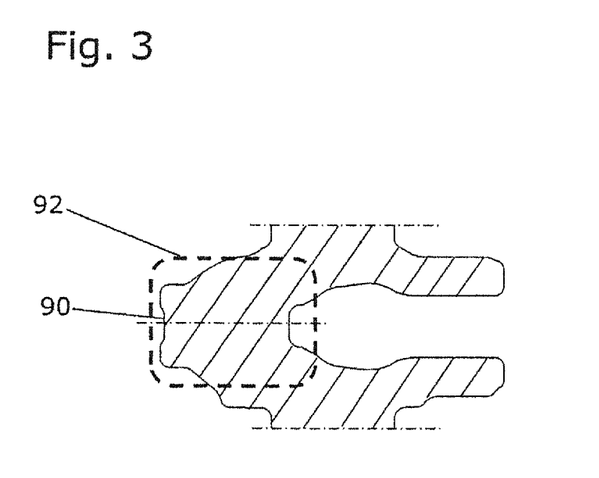
FIG. 3 is a sectional view through a portion of a crankshaft, with the region under consideration marked.
Figure 4:
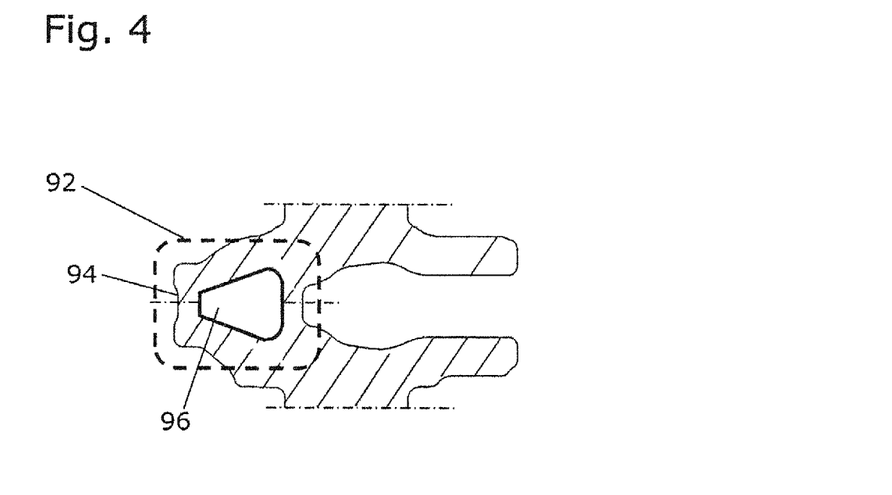
FIG. 4 is a sectional view through a portion of a crankshaft with the region and cavity under consideration marked.

Here, FIG. 2 shows a portion of a conventional crankshaft, which comprises, for example, a pin bearing 90. In FIG. 3, the pin bearing 90 has been labeled with a marked region 92, on which the volume of the core for the casting process, and thus the subsequent cavity, is dependent. Transferred to the crankshaft 1 according to the invention, the region 92 symbolizes the regions 70, 72, 74, 76, 78, 80 and 82. For the exemplary region 92, the cooling rate during the solidification process is known, for example from simulation, tests or the like. Owing to the known cooling rate, it is now the case that a volume of a core, and thus a volume of the subsequent cavity 96 in the portion 94 according to the invention, see FIG. 4, is selected such that the subsequently resulting cooling rate corresponds to a desired cooling rate, that is to say lies for example as close as possible to the maximum cooling rate of the cast component or is based on a desired material characteristic in the marked region. The ratio of the volume of the resulting cavity 96 in relation to the region 92 will hereinafter be referred to as relative volume. This applies analogously to the cavities 32, 34, 36, 38, 40, 42 and 44 in relation to the regions 70, 72, 74, 76, 78, 80 and 82. Depending on the cooling rates, the relative volume preferably lies between 25 and 75%. In a particularly preferred embodiment, it is possible, in the configuration of the relative volume of the cavity 96, for consideration to be given not only to the cooling rate but also to a subsequent load that is expected to be exerted on the component in the respective region 92.

Referring again to the casting method according to the invention, the first core refers to the core which has the smallest volume in relation to its region, that is to say the smallest relative volume. The second core refers to the core which has the greatest relative volume. The first core thus has a smaller relative volume than the second core. The remaining six cores have a relative volume which lies between the first relative volume and the second relative volume.

The eight cores are arranged in the interior of the casting mold in step C. Here, the eight cores are arranged in the interior of the casting mold such that the first core is situated in a region with a first cooling rate. In relation to a conventional cast component, the first cooling rate in the first region is higher than a second cooling rate in a second region, in which the second core is arranged. The first core serves for forming the first cavity 30, wherein the second core forms the second cavity 44. Furthermore, the eight cores are preferably arranged in the interior of the casting mold so as to be situated in regions which, individually or collectively, have a large volume in relation to the cast component as a whole. In a cast component according to prior art, said regions would also be referred to as regions with material accumulations.

The eight cores are arranged in the shell casting mold 100 by way of supporting points or a supporting structure. By means of the supporting structure, it is possible for two or more cores to be connected to one another such that, in the subsequent cast component, corresponding connecting ducts are formed between the two or more cores and/or the surface of the resulting cast component. Chromium ore sand is used as material for the eight cores and preferably also for the respective supporting structure.

After the eight cores have been arranged in the first half of the shell casting mold 100 by way of the supporting structure, the second half of the shell casting mold is connected to the first half of the shell casting mold 100, for example by way of adhesive bonding. The shell casting mold is then arranged in a casting tub and fixed there by way of steel balls, in a manner already known from the prior art. Subsequently, in step D, the casting material, preferably cast iron, is introduced from below.

After the complete solidification of the material in the casting mold, the finished cast component is removed from the casting mold in step E. The eight cores that are provided, and the supporting structure, can be removed in the manner known from the prior art. This will therefore not be discussed in any more detail.

It can be clearly seen in FIG. 1 that the volume of the cavities 30, 32, 34, 36, 38, 40, 42 and 44 in relation to the respective region 70, 72, 74, 76, 78, 80 and 82 increases along the longitudinal axis 3 of the crankshaft 1 proceeding from the gearbox side. As a consequence, the relative material thickness in the respective regions 70, 72, 74, 76, 78, 80 and 82 with material accumulations, that is to say at the locations at which the cores are arranged, decreases with advancing filling direction. The cores are arranged in particular in the region of the main bearings 20, 22, 24, 26 and 28 and/or pin bearings 10, 12, 14 and 16, because it is there, in the case of a cast crankshaft 1, that the lowest cooling rates normally prevail owing to material accumulations.

The crankshaft 1 according to the invention produced in this way has, in the region of a main bearing 28, a cavity 30 formed by way of the first core. Further cavities 32, 36, 40 and 44 are formed in the pin bearings 10, 12, 14 and 16. Furthermore, along the longitudinal axis 3 of the crankshaft 1, the cavities 34, 38 and 42 are provided at the main bearings 22, 24 and 26, that is to say in regions with material accumulations. In this way, at the corresponding locations, the material thickness of the crankshaft 1 can be optimized with regard to the cooling rates during the solidification process during the course of a casting process. This, in turn, leads to a higher cooling speed, and thus to higher strength characteristic values in the corresponding regions, which is advantageous.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A casting method for producing a complex cast component of an internal combustion engine, the method comprising the acts of:
   providing a casting mold;
   providing a multiplicity of cores in a multiplicity of regions of the cast component during a solidification process, the multiplicity of cores are arranged in the casting mold such that a volume of each core of the multiplicity of cores is dependent on a specific cooling rate relative to a respective region of the multiplicity of regions in which it is arranged, the respective volume increases along a longitudinal axis of the cast component which is to be cast, wherein the multiplicity of regions comprises more than two regions, and wherein each region of the multiplicity of regions at least partially comprises either a main bearing or a pin bearing;
   introducing a casting material into the casting mold; and
   removing a finished cast component from the casting mold after the solidification process is complete.

2. The casting method according to claim 1, wherein a ratio of the volume of each core in relation to the respective region lies between 25% and 75%.

3. The casting method according to claim 2, wherein the respective regions take up equal volumes in relation to the component as a whole.

4. The casting method according to claim 2, wherein a material of each core is selected from materials which have a better heat abstraction rate than the heat abstraction rate of quartz sand.

5. The casting method according to claim 4, wherein the material of each core is chromium ore sand.

6. The casting method according to claim 1, wherein the casting method is a shell mold casting method.

* * * * *